United States Patent
Negre et al.

(10) Patent No.: US 8,191,350 B2
(45) Date of Patent: Jun. 5, 2012

(54) COMPRESSED-AIR OR GAS AND/OR ADDITIONAL-ENERGY ENGINE HAVING AN ACTIVE EXPANSION CHAMBER

(75) Inventors: Guy Negre, Villeneuve Loubet (FR); Cyril Negre, Nice (FR)

(73) Assignee: MDI-Motor Development International S.A., Luxemburg (LU)

( * ) Notice: Subject to any disclaimer, the term of this patent is extended or adjusted under 35 U.S.C. 154(b) by 743 days.

(21) Appl. No.: 12/439,941

(22) PCT Filed: Sep. 3, 2007

(86) PCT No.: PCT/EP2007/059161
§ 371 (c)(1),
(2), (4) Date: Mar. 4, 2009

(87) PCT Pub. No.: WO2008/028881
PCT Pub. Date: Mar. 13, 2008

(65) Prior Publication Data
US 2010/0051003 A1    Mar. 4, 2010

(30) Foreign Application Priority Data
Sep. 5, 2006 (FR) .................... 06 07742

(51) Int. Cl.
*F02C 5/00* (2006.01)
(52) U.S. Cl. .......................... 60/39.6; 60/516
(58) Field of Classification Search .................. 60/39.6, 60/516–518
See application file for complete search history.

(56) References Cited

U.S. PATENT DOCUMENTS

| 3,267,661 A | | 8/1966 | Petrie | |
|---|---|---|---|---|
| 4,651,525 A | | 3/1987 | Cestero | |
| 6,094,915 A | * | 8/2000 | Negre et al. | 60/712 |
| 6,199,369 B1 | * | 3/2001 | Meyer | 60/39.6 |
| 6,886,326 B2 | * | 5/2005 | Holtzapple et al. | 60/39.6 |
| 7,469,527 B2 | * | 12/2008 | Negre et al. | 60/39.6 |

FOREIGN PATENT DOCUMENTS

| DE | 2422672 | 11/1975 |
|---|---|---|
| EP | 0307297 | 3/1989 |
| EP | 0382586 | 8/1990 |
| FR | 1009307 | 5/1952 |
| FR | 2862349 | 5/2005 |

(Continued)

OTHER PUBLICATIONS

International Search Report dated Dec. 21, 2007, in PCT application.

*Primary Examiner* — Hoang Nguyen
(74) *Attorney, Agent, or Firm* — Young & Thompson (57) ABSTRACT

An engine supplied with compressed air includes a main drive piston (1) driving a crankshaft (5) and one active expansion chamber (13) of a variable volume allowing work to be produced and which is connected, by a passage (6), with the volume contained in the driving cylinder (2). The passage (6) includes a shutter (7) thus allowing the active expansion chamber to be isolated from or to be placed in contact with the dead volume, in such a manner that the engine works according to a four-phase thermodynamic cycle: * an isothermal expansion without work; * a transfer-slight expansion with work known as quasi-isothermal; * a polytropic expansion with work; * an exhaust at ambient pressure.

20 Claims, 7 Drawing Sheets

FOREIGN PATENT DOCUMENTS

| | | |
|---|---|---|
| WO | 9627737 | 9/1996 |
| WO | 9739232 | 10/1997 |
| WO | 9812062 | 3/1998 |
| WO | 9815440 | 4/1998 |
| WO | 9832963 | 7/1998 |
| WO | 9937885 | 7/1999 |
| WO | 0169080 | 9/2001 |
| WO | 9748884 | 5/2002 |
| WO | 02070876 | 9/2002 |
| WO | 03036088 | 5/2003 |
| WO | 03089764 | 10/2003 |
| WO | 2005049968 | 6/2005 |

* cited by examiner

COMPRESSED-AIR OR GAS AND/OR ADDITIONAL-ENERGY ENGINE HAVING AN ACTIVE EXPANSION CHAMBER

The invention relates to an engine operating in particular on compressed air, or on any other compressed gas and having an active expansion chamber.

BACKGROUND OF THE ART

The inventors have filed several patents concerning propulsion systems and installations thereof, using gases, especially compressed air, for completely clean operation in urban and suburban sites:
WO 96/27737—WO 97/39232—WO 97/48884—WO 98/12062—WO 98/15440—WO 98/32963—WO 99/37885—WO 01/69080—WO 03/036088

In their international patent application WO 99/37885, to the content of which reference may be made, they propose a solution which increases the amount of usable and available energy, wherein the compressed air, before being introduced into the combustion and/or expansion chamber, from the storage tank, is directly, or after having been passed through the heat exchanger or exchangers of the ambient thermal energy recovery device, and before being introduced into the combustion chamber, is conveyed to a thermal heater where, as a result of its temperature increasing, it will further increase in pressure and/or in volume before being introduced into the combustion and/or expansion chamber of the engine, thereby again considerably increasing the performance that can be achieved by the said engine.

The use of a thermal reheater, and despite the use of a fossil fuel, has the advantage of being able to use clean continuous combustions that can be catalysed or depolluted by all known means for the purpose of obtaining emissions with infinitesimal pollutants.

The use of a thermal heater, and this is true in spite of the fact that a fossil fuel is used, has the advantage that clean continuous combustion can be employed which can be catalytically converted or rid of pollution by any known means with a view to obtaining infinitesimally small levels of pollutant emissions.

The inventors have filed a patent application WO 03/036088, to the content of which it is possible to refer, relating to an additional compressed air injection motor-compressor—motor-alternator set operating on single and multiple energies.

In these types of engine operating on compressed air and comprising a compressed-air storage tank, it is necessary to expand the compressed air, which is stored at very high pressure in the tank but the pressure of which decreases as the tank empties, to a stable intermediate pressure known as the end-use pressure in a buffer capacity known as the working capacity before it can be used in the engine cylinder or cylinders. The well-known conventional regulators of the shutter and spring type have very low flow rates and using these in such an application requires very cumbersome and poorly-performing devices; what is more, they are highly sensitive to icing as a result of the humidity in the air that is cooled during the expansion.

In order to solve this problem, the inventors have also filed an international patent application WO-A1-031089764, to the content of which reference may be made, concerning a variable flow rate dynamic regulator and a distribution system for engines supplied with an injection of compressed air, comprising a high-pressure compressed air tank and a working capacity.

The inventors have also filed a patent application WO-A1-02/070876 concerning a variable-volume expansion chamber consisting of two distinct capacities, one of which is in communication with the compressed air inlet and the other one of which is twinned with the cylinder, which capacities can be placed in communication with one another or isolated in such a way that during the exhaust cycle it is possible to charge the first one of these capacities with compressed air and then establish the pressure in the second one, immediately at the end of the exhaust while the piston is stationary at top dead centre and before it resumes its stroke, the two capacities remaining in communication and expanding together in order to perform the power stroke and that at least one of the two capacities is provided with means of modifying its volume so as to allow the resultant engine torque to be varied at the same pressure.

In the operation of these "charge expansion" engines, the filling of the expansion chamber always represents an expansion without work prejudicial to the overall efficiency of the machine.

In order to solve the abovementioned problem, the inventors have also filed a patent application WO-A1-2005/049968 describing an engine with an active chamber in which the expansion chamber consists of a variable volume equipped with means for producing work and is twinned and in permanent contact via a passage with the space above the main driving piston.

WO-A1-2005/049968 (FR-A1-2.862.349) in particular illustrates a four-phase thermodynamic cycle in operation in compressed air mono(single)-energy mode, characterized by:
an isothermal expansion without work;
a transfer-slight expansion with work said to be quasi-isothermal;
a polytropic expansion with work;
an exhaust at ambient pressure.

The engine operates on the above thermodynamic cycle and uses a conventional connecting rod/crank arrangement. It is preferably supplied with compressed air or any other compressed gas contained in a high-pressure storage tank through a buffer capacity known as the working capacity. The working capacity in the dual-energy version comprises a device for heating the air which is supplied by an additional energy (fossil or some other energy source) so as to increase the temperature and/or the pressure of the air passing through it.

In this latter document WO-A1-2005/049968 (FR-A1-2.862.349), such an operation an thermodynamic cycle are obtained by mechanical means connecting the main drive piston, the working crankshaft and the piston of the active expansion chamber.

It is an object of the present invention to simplify the design of such an engine, while keeping all the above mentioned advantages.

SUMMARY OF THE INVENTION

To this end, the invention proposes an engine supplied with compressed air, or with any other compressed gas contained in a high-pressure storage tank and comprising:
at least one main drive piston which slides in a drive cylinder driving a crankshaft in a conventional connecting rod/crank arrangement,
and at least one active expansion chamber which consists of a variable volume equipped with means allowing work to be produced and which is connected, by a passage, with the volume, called dead volume, contained in the driving cylinder above the driving piston at its top dead centre, characterized:

in that the said passage comprises a shutter thus allowing the said active expansion chamber to be isolated from or to be placed in contact with the dead volume, in that the engine comprises an inlet duct which opens in the active expansion chamber and which allows the engine to be supplied with compressed air or with compressed gas, in that the compressed air or gas is let into the expansion chamber when this chamber is at its smallest volume and which, under the thrust of the compressed air, will increase in volume, thereby producing a work, in that when the expansion chamber is more or less at its maximum volume and the driving piston is more or less at its top dead centre, the inlet duct is shuttered, and the said active expansion chamber is placed in communication with the driving cylinder and the compressed air, or the compressed gas, which is contained in the active expansion chamber expands, thus pushing the driving piston back in its downstroke, thereby in its turn supplying a work, in that during the expansion, the volume of the active expansion chamber is returned to its minimum volume to allow a new cycle to commence, in such a manner that the engine works according to a four-phase thermodynamic cycle:
an isothermal expansion without work;
a transfer-slight expansion with work said to be quasi-isothermal;
a polytropic expansion with work;
an exhaust at ambient pressure.

According to other features of the invention:
the said dead volume is reduced to the minimum that the mechanical tolerances can allow, so as to avoid work-free expansion when the active expansion chamber is placed in communication with the dead volume;

the engine is supplied with compressed air or gas through a buffer capacity, said as the working capacity, which is supplied with the high-pressure compressed air contained in the storage tank and which is expanded to a medium pressure, said as the working pressure, in the said working capacity, preferably through a dynamic regulator device; the engine according is advantageously equipped with a variable flow rate regulator in accordance with international patent application WO-A1-03/089764 known as a dynamic regulator which allows the working capacity to be supplied at its service pressure with compressed air from the storage tank by performing expansion without work of the isothermal type;

the working capacity comprises a heating device for heating the compressed air or gas using an additional energy, fossil fuel or some other form of energy, the said heating device allowing the temperature and/or the pressure of the air passing through it to be increased; this arrangement makes it possible to increase the amount of usable and available energy through the fact that the compressed air or gas, before being introduced into the active expansion chamber, will increase in temperature and increase in pressure and/or in volume making it possible to increase performance and/or range; the thermal heater can use, for its energy, a fossil fuel such as petrol, diesel or alternatively LPG or natural gas (NG) for vehicles; it can use biofuels or alcohol fuels thus allowing dual-energy operation with external combustion in which a burner will cause an increase in temperature;

the compressed air or gas is heated by burning a fuel—fossil or biological—directly in the compressed air or gas, the engine then being said to be an external internal combustion engine;

the thermal heater is a thermal heater which uses a thermochemical solid method gas reaction based on the conversion by evaporation of a reactive fluid contained in an evaporator, for example liquid ammonia into a gas which will react with a solid reagent contained in a reactor, for example salts such as calcium chloride, manganese chloride, barium chloride or the like, the chemical reaction of which produces heat and which, when the reaction is over, can be regenerated by supplying heat to the reactor in order to desorb the gaseous ammonia which will then recondense in the evaporator; the heater advantageously uses thermochemical methods such as those used and described for example in patents EP-A1-0.307.297 and EP-B1-0.382.586, the system operating like a thermal battery;

the engine operates in a dual-energy mode with an additional energy, and in that the thermodynamic cycle in this dual-energy mode is characterized by an isothermal expansion without work with the conservation of energy performed in the said working capacity, by increasing the temperature of the air or gas by heating it using fossil energy, followed by a very slight expansion known as quasi-isothermal, with work, polytropic expansion with work in the driving cylinder and finally exhaust at atmospheric pressure, representing five successive phases as follows:

an isothermal expansion;
an increase in temperature;
a transfer-slight expansion with work said to be quasi-isothermal;
a polytropic expansion with work;
an exhaust at ambient pressure;

the engine torque and engine speed are controlled by controlling the pressure in the said working capacity; the said control advantageously being provided by the dynamic regulator;

the engine operates in dual-energy operating mode with additional energy, and during the dual-energy mode, an electronic control unit controls the amount of additional energy supplied depending on the pressure of the compressed air or gas, and therefore on the mass of air introduced into the said working capacity;

the said variable volume of the active expansion chamber consists of a piston, said as the charge piston, which slides in a cylinder and which is connected by a connecting rod to the crankshaft of the engine the engine is supplied with the compressed air or gas which is contained in the high-pressure tank and/or it operates in dual-energy mode with additional energy, and, in order to allow autonomous operation when the compressed-air or gas storage tank is empty and when being used with additional energy, the engine with active expansion chamber is coupled to an air or gas compressor allowing the high-pressure compressed-air or gas storage tank to be supplied with compressed air or gas;

the said compressor directly supplies the working capacity; in such a case, engine control is performed by controlling the pressure of the compressor, and a dynamic regulator arranged between the high-pressure storage tank and the working capacity remains shut off;

the coupled compressor supplies in combination the storage tank and the working capacity;

the engine operates in mono-energy mode with fossil fuel, plant fuel or the like, allowing the air or gas contained in the working capacity, compressed only by the coupled compressor, to be heated, the high-pressure compressed-air or gas storage tank then being quite simply omitted;

the exhaust following relief is recirculated to the inlet side of the coupled compressor;

operating in compressed air mono-energy mode, the engine consists of several expansion stages of increasing cylinder capacity, each stage comprising an active expansion chamber consisting of a variable volume equipped with means allowing work to be produced and in that between each stage there is an exchanger to heat the air exhausted from the previous stage;

the engine operates in dual-energy mode with additional energy, and the exchanger positioned between each stage is equipped with an additional-energy heating device;

the exchangers and the heating device are combined, together or separately, into a multi-stage device using the same source of energy.

The thermodynamic cycle according to the invention is characterized by an isothermal expansion without work which is allowed by the dynamic regulator, followed by a transfer accompanied by a very small quasi-isothermal expansion—for example, a capacity of 3000 cubic centimeters into a capacity of 3050 cubic centimeters—with a first work by use of the pressure of the air or gas contained in the working capacity, while the active expansion chamber is being filled, followed by polytropic expansion of the expansion chamber into the driving cylinder with a second work and a reduction in temperature ending with exhausting of the expanded air to the atmosphere.

According to one alternative form of the invention, the engine with an active expansion chamber is equipped with a thermal heater with burner, or the like, and with a thermochemical heater of the abovementioned type which can be used together or in succession during phase 1 of the thermochemical heater during which the thermal heater with a burner will regenerate (phase 2) the thermochemical heater when the latter is empty by heating its reactor while the unit continues to operate with use of the burner heater.

In the case of the use of a combustion heater, the engine with an active expansion chamber according to the invention is an engine with external combustion chamber, known as an external combustion engine. However, either the combustions of the said heater may be internal if the flame is brought directly into contact with the operating compressed air, in which case the engine is said to be an "internal-external combustion engine", or the combustions of the said heater are external with the operating air heated through an exchanger, in which case the engine is said to be an "external-external combustion engine".

In the mode of operation with additional energy, the thermodynamic cycle then comprises the five above mentioned phases.

During operation in compressed air mode, on a vehicle in an urban setting for example, only the pressure of the compressed air in the high-pressure tank is used for running; during operation in additional energy mode, using fossil or some other form of energy, on a vehicle on the highway for example, the heating of the working capacity is then demanded, making it possible to increase the temperature of the air passing through it and therefore the volume and/or the pressure that can be used for the work of charging the active expansion chamber and expansion.

The dual-energy engine with an active expansion chamber may operate in two modes using, on a vehicle in town for example, the zero-pollution mode of operation with compressed air contained in the high-pressure storage tank and, on the highway, again for example, the additional energy mode of operation with its thermal heater supplied with fossil energy or some other form of energy while at the same time the high-pressure storage tank is resupplied with air by an air compressor.

The dual-energy engine with active expansion chamber according to the invention in fact may have three main modes of operation:

compressed-air mono-energy mode
compressed air plus additional energy dual-energy mode
additional-energy fuel mono-energy mode.

The engine with active expansion chamber can also be produced in a mono-energy fossil fuel or some other fuel version when coupled to an air compressor supplying the working capacity as described hereinabove, the high-pressure compressed-air storage tank then being quite simply omitted.

In the case of a compressed-air mono-energy engine, expansion in the first cylinder having caused a drop in temperature, the air will advantageously be heated in an air-air exchanger exchanging energy with the ambient surroundings.

In the case of a dual-energy engine operating in additional-energy mode, the air is heated using additional energy in a thermal heater, for example using fossil fuels.

According to an alternative form of this arrangement, after each stage, the exhaust air is directed to a single multi-stage heater thus making it possible to use just one combustion source.

The heat exchangers may be air-air or air-liquid exchangers or any other device or gas that produces the desired effect.

The engine with an active expansion chamber according to the invention can be used on all land, marine, rail or air vehicles. The engine with an active expansion chamber according to the invention may also and advantageously find applications in back-up generator sets and also in numerous domestic cogeneration applications producing electricity and heat and providing climate control.

BRIEF DESCRIPTION OF THE DRAWINGS

Other objects, advantages and features of the invention will become apparent from reading the description, given without any implied limitation, of a number of embodiments, made with reference to the attached drawings in which.

DETAILED DESCRIPTION OF THE DRAWINGS

Figure 1:
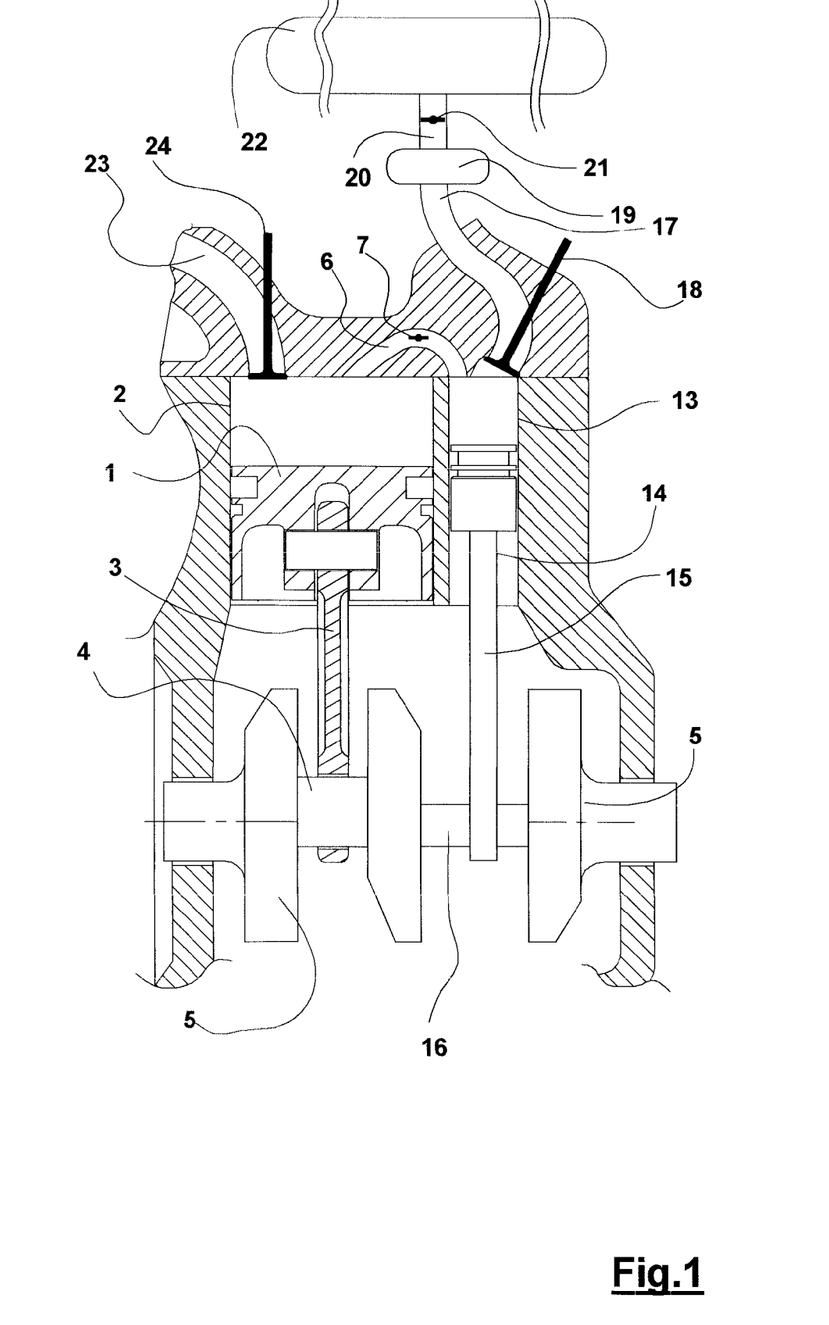
FIG. 1 schematically depicts an engine with an active expansion chamber viewed in longitudinal section, and its high-pressure (HP) air supply device.

FIG. 1 depicts an engine with an active expansion chamber according to the invention showing the driving cylinder 2 in which there slides the main driving piston 1, sliding in the cylinder 2, and connected via a connecting rod 3 to the crank pin 4 of a crankshaft 5.

The driving cylinder 2 is in communication near its top via a passage 6 equipped with a shutter 7 with an active expansion chamber cylinder 13 in which there slides a piston 14 said as the charge piston connected by a connecting rod 15 to a crank pin 16 substantially opposite and positioned 180° from the crank pin 4 of the driving cylinder on the crankshaft 5.

An inlet duct 17, controlled by a valve 18, opens into the active expansion chamber cylinder 13 and allows the engine to be supplied with compressed air from the working chamber 19 kept at the working pressure and itself supplied with compressed air through a duct 20 controlled by a dynamic regulator 21 by a high pressure storage tank 22.

Formed in the upper part of the cylinder 1 is an exhaust duct 23 controlled by an exhaust valve 24.

A device controlled by the accelerator pedal controls the dynamic regulator 21 to regulate the pressure in the working chamber and thus control the engine.

Figure 2:
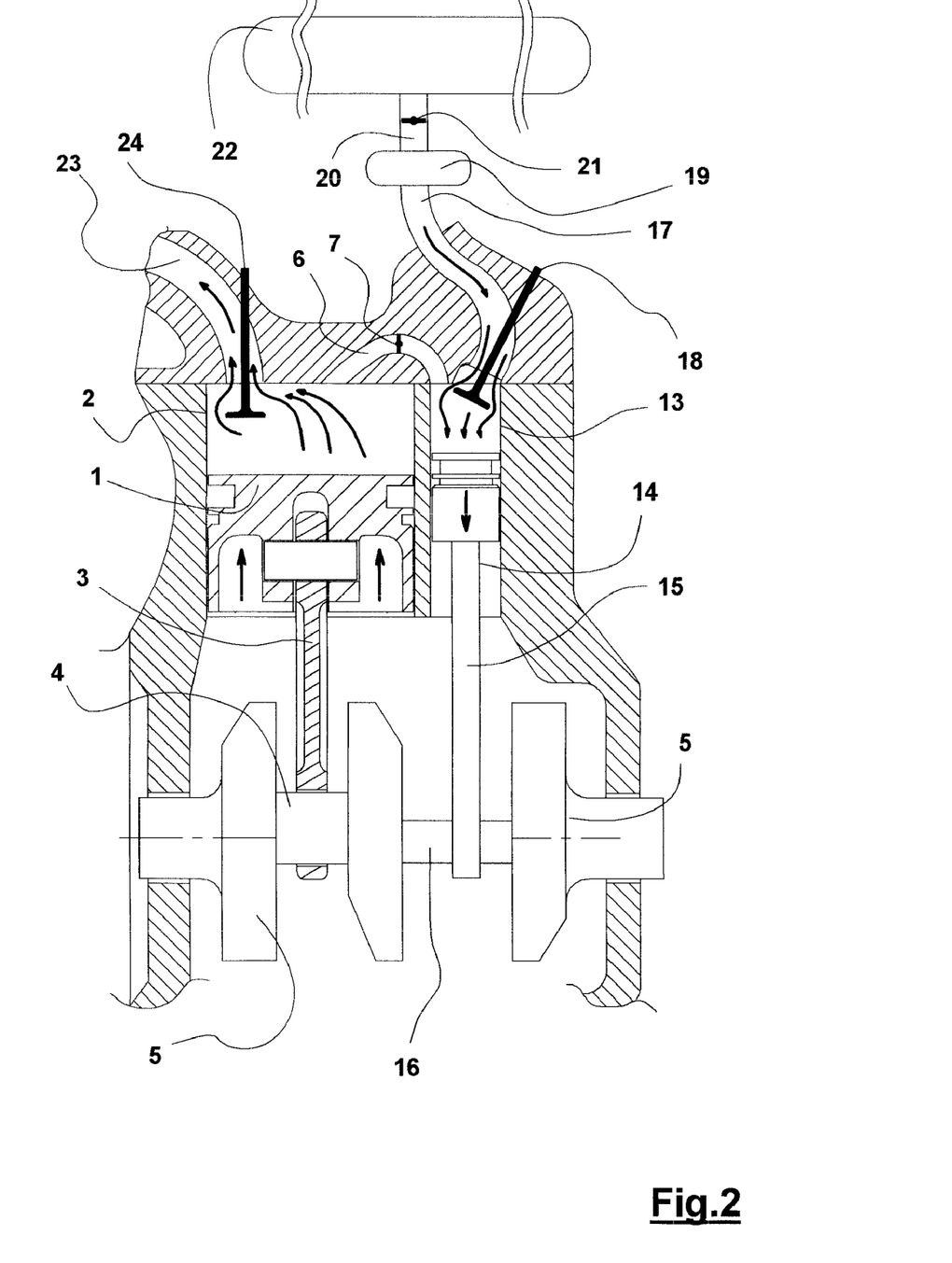
FIGS. 2 to 4 depict schematic views in longitudinal section of the various phases of operation of the engine of FIG. 1.

FIG. 2 depicts the engine with an active expansion chamber according to the invention during the inlet phase. The driving piston 1 is in its upstroke and is exhausting, through the duct 23 and with the exhaust valve 24 open, air that was expanded during the previous cycle. The inlet valve 18 is open and the pressure of the air contained in the working capacity 19 drives the charge piston 14 back thus producing its downstroke, while at the same time filling the cylinder of the active expansion chamber 13 and producing a first work thereby, via its connecting rod 15, turning the crankshaft 9, this first work being considerable because it is performed at quasi-constant pressure, i.e. substantially without relief.

Figures 3, 4:
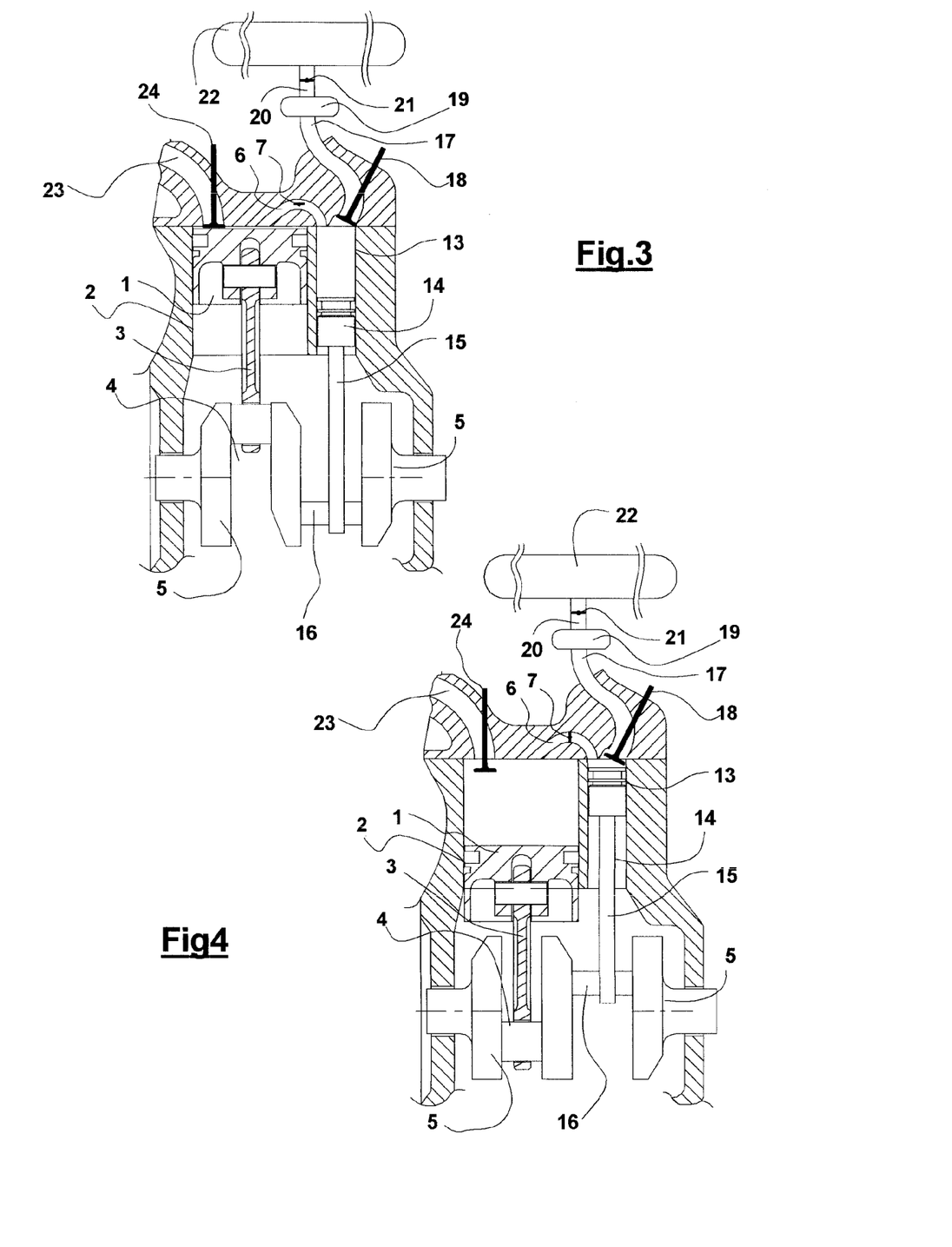

As it continues to turn—FIG. 3—the driving piston 1 more or less reaches its top dead centre and more or less at the same time the exhaust valve 24 and the inlet valve 18 are then closed again and the shutter 7 of the connecting duct 6 is opened. The charge or quantity of compressed air contained in the active expansion chamber 13 expands, pushing the driving piston 1 back in its downstroke and thus in turn producing a second work, thereby turning the crankshaft 9. During this downstroke of the driving piston 1, the charge piston 14 continues to rise towards top its dead centre.

As it continues to turn—FIG. 4—the driving piston 1 reaches its bottom dead centre and the charge piston 14 reaches its top dead centre. The shutter 7 is then closed again and the inlet 18 and exhaust 24 valves are then opened to allow a further charge to be let into the active expansion chamber 13 and the previous charge expanded in the driving cylinder 2 to be exhausted towards the atmosphere.

Figure 5:
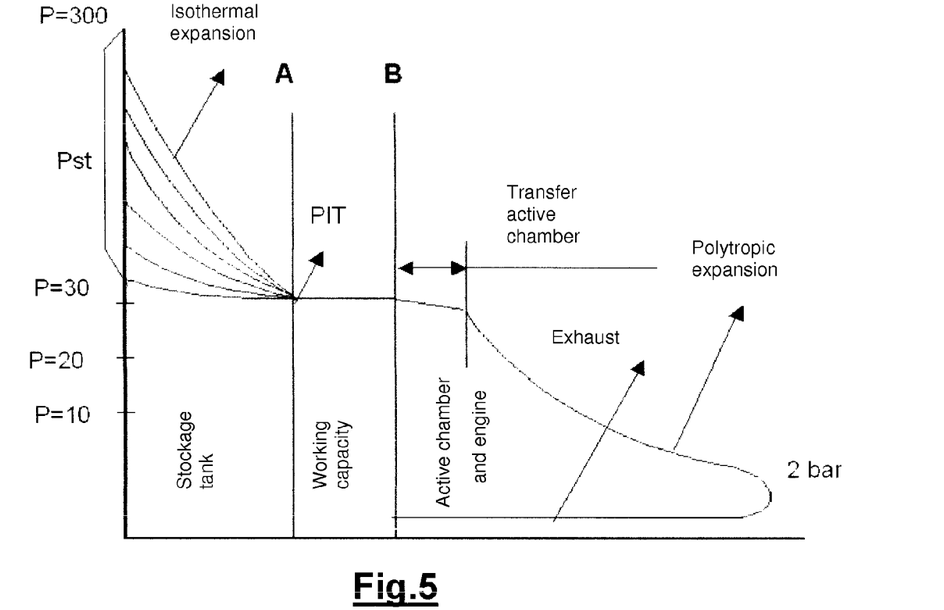
FIG. 5 depicts a graph of the thermodynamic cycle in compressed-air mono-energy mode.

FIG. 5 depicts the graph of the thermodynamic cycle of the engine operating in compressed-air mono-energy mode and FIG. 5 shows the various phases of the cycle in the various capacities (along the abscissa axis) that make up the engine with an active expansion chamber according to the invention, the pressures being shown on the ordinate axis.

In the first capacity, which is the storage tank 22, there is a collection of isothermal curves ranging from the storage pressure Pst to the initial work pressure PIT, the storage pressure reducing as the tank becomes empty while the pressure PIT will be controlled according to the desired torque between a minimum operating pressure and a maximum operating pressure, in this example, between 10 and 30 bar.

In the working capacity 19 during charging of the active expansion chamber 13, the pressure remains almost the same. As soon as the inlet valve opens, the compressed air contained in the working capacity is transferred into the active expansion chamber, producing work accompanied by a very slight reduction in pressure. For example, for a working capacity of 3000 cm$^3$ and an active expansion chamber of 35 cm$^3$ the pressure drop is 1.16%, namely, and still by way of example, an actual working pressure of 29.65 bar for an initial working pressure of 30 bar.

The driving piston then begins its downstroke with polytropic expansion which produces work with a reduction in pressure until the exhaust valve opens (for example at around 2 bar) followed by a return to atmospheric pressure during the exhaust stroke, before beginning a new cycle.

Figure 6:
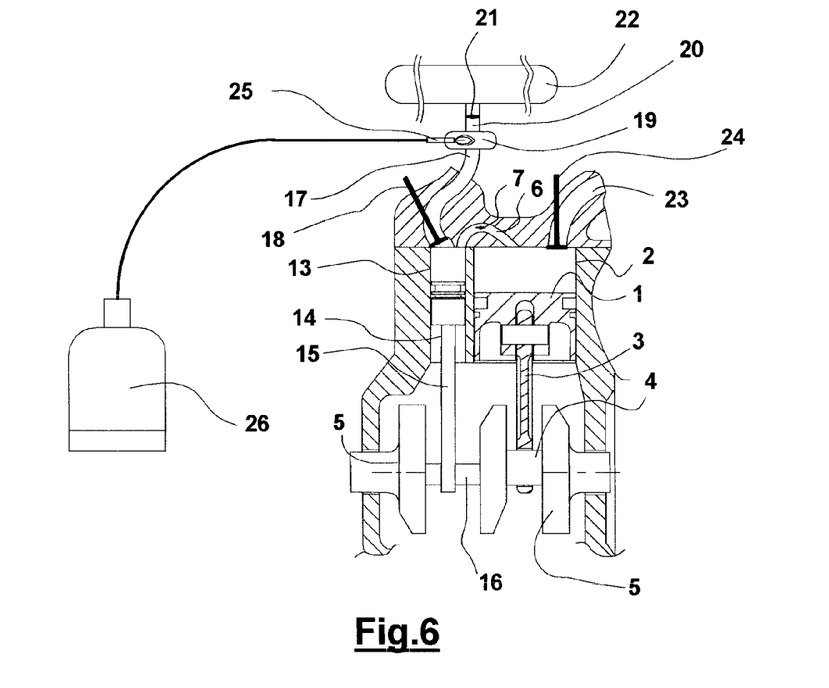
FIG. 6 schematically depicts an engine with an active expansion chamber viewed in cross section and its HP air supply device comprising a device for heating the air by combustion.

FIG. 6 depicts the engine in its entirety in the dual-energy version and shows, in the working capacity 19, a schematic heating device for heating the compressed air by supplying additional energy, in this instance a burner 25 supplied by a gas cylinder 26. The combustion depicted in this FIG. 6 is therefore an internal-external combustion and allows the volume and/or pressure of the compressed air from the storage tank to be increased considerably.

Figure 7:
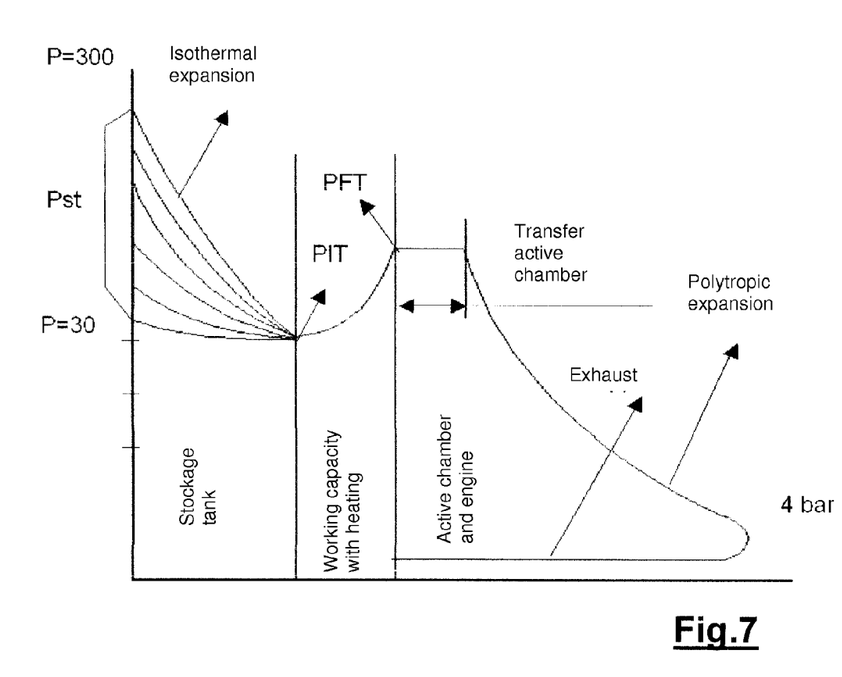
FIG. 7 depicts a graph of the thermodynamic cycle in compressed-air and additive dual-energy mode.

FIG. 7 depicts a graph of the thermodynamic cycle in additional-energy dual-energy mode and shows the various phases of the cycle in the various capacities that make up the engine with an active expansion chamber according to the invention with the pressures on the ordinate axis.

In the first capacity which is the storage tank there is a collection of isothermal curves ranging from the storage pressure Pst to the initial working pressure PIT, the storage pressure decreasing as the tank is emptied while the pressure PIT will be controlled according to the desired torque between a minimal operating pressure and a maximum operating pressure here, for example, between 10 and 30 bar.

In the working capacity 19, heating the compressed air allows the pressure to be increased considerably from the initial pressure PIT to the final working pressure PFT. For example, for a PIT of 30 bar, an increase in temperature by about 300° C. makes it possible to obtain a PFT of about 60 bar. As soon as the inlet valve is opened, the compressed air contained in the working capacity is transferred to the active expansion chamber, producing work, accompanied by a very slight reduction in pressure—for example, for a working capacity of 3000 cm$^3$ and an active expansion chamber of 35 cm$^3$, the pressure drop is 1.16%, namely, and still by way of example, an actual working pressure of 59.30 bar for an initial working pressure of 60 bar.

The driving piston then begins its downstroke with a polytropic expansion which produces work with a reduction in pressure until the exhaust valve opens (for example at around 2 bar) followed by a return to atmospheric pressure during the exhaust stroke, in order to begin a new cycle.

Figure 8:
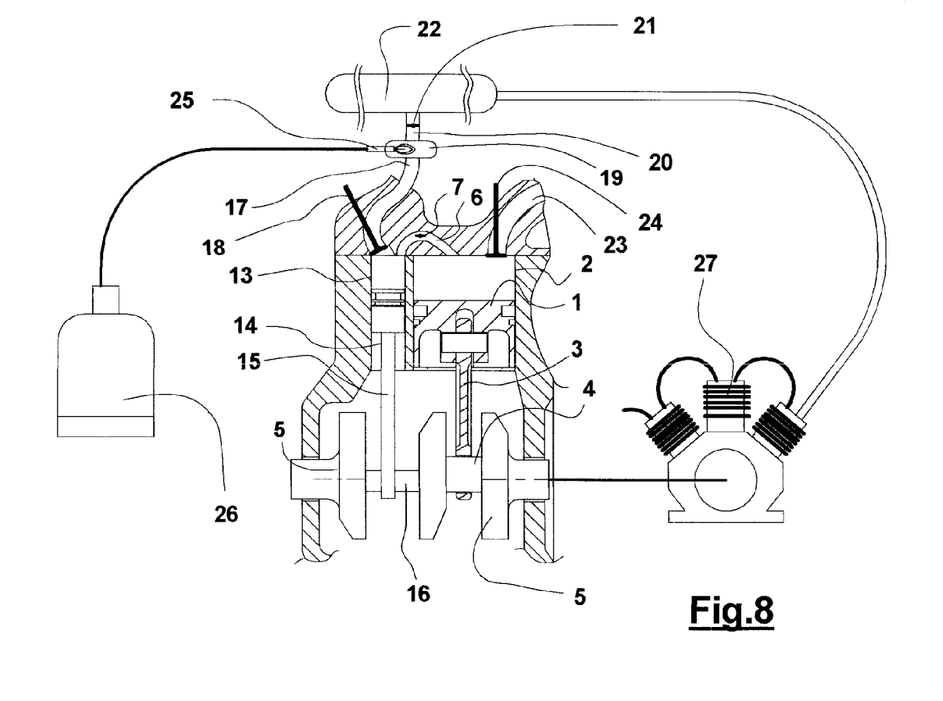
FIG. 8 depicts, viewed schematically, an engine with an active expansion chamber coupled to an air compressor allowing for autonomous operation.

The engine with an active expansion chamber also operates in dual-energy mode autonomously using energy known as additional energy which may be of a fossil or plant origin—FIG. 8—when, according to an alternative form of the invention, it drives a compressed air compressor 27 which supplies the storage tank 22.

The overall operation of the machine is the same as described before with respect to FIGS. 1 to 4. However, this arrangement allows the storage tank 22 to be refilled during operation using additional energy but leads to a relatively substantial energy loss owing to the compressor.

According to another alternative form of the invention (not depicted in the drawings), the air compressor supplies the working capacity directly. In this form of operation, the dynamic regulator 21 is kept closed and the compressor 27 supplies the working capacity with compressed air and it is in this working capacity that this air is heated by the heating device and increases in pressure and/or in volume in order to be fed into the active expansion chamber 13 as described in the preceding cases. Again in this form of operation, engine control is performed by regulating the pressure directly using the compressor and the loss of energy due to the compressor is far lower than it was in the preceding case.

Figure 9:
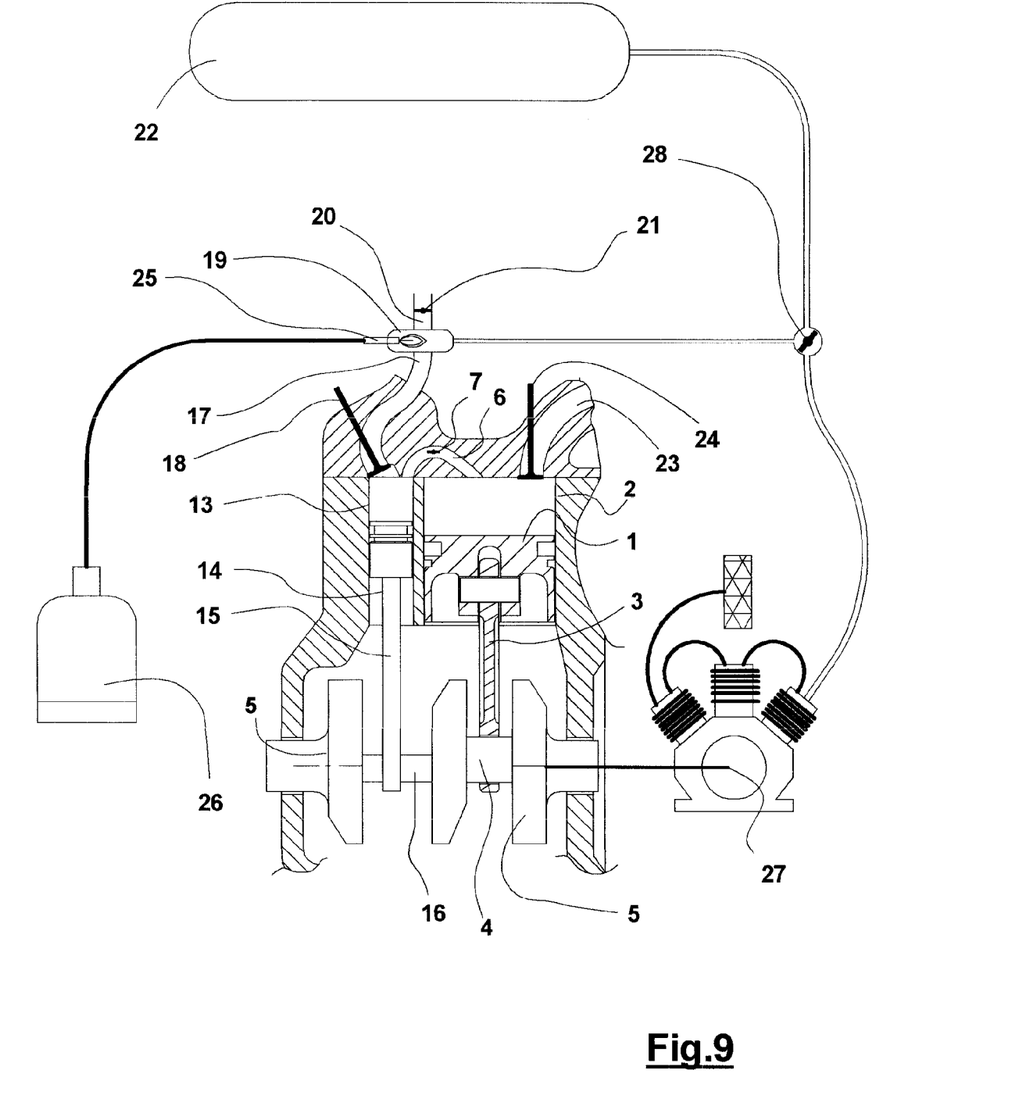
FIG. 9 schematically depicts an engine with an active expansion chamber coupled to a compressor supplying the storage tank and the working capacity.

Finally, and according to another alternative form of the invention—FIG. 9—the compressor simultaneously or in succession, according to energy requirements, supplies the high-pressure storage tank 22 and the working capacity 19. A two-way valve 28 allows either the storage tank 22 or the working capacity 19, or both simultaneously, to be supplied with air. The choice is then dependent on the energy requirements of the engine with respect to the energy requirements of the compressor: if the demand on the engine is relatively low, the high-pressure tank is then supplied; if the engine energy requirements are high, only the working capacity is then supplied.

Figure 10:
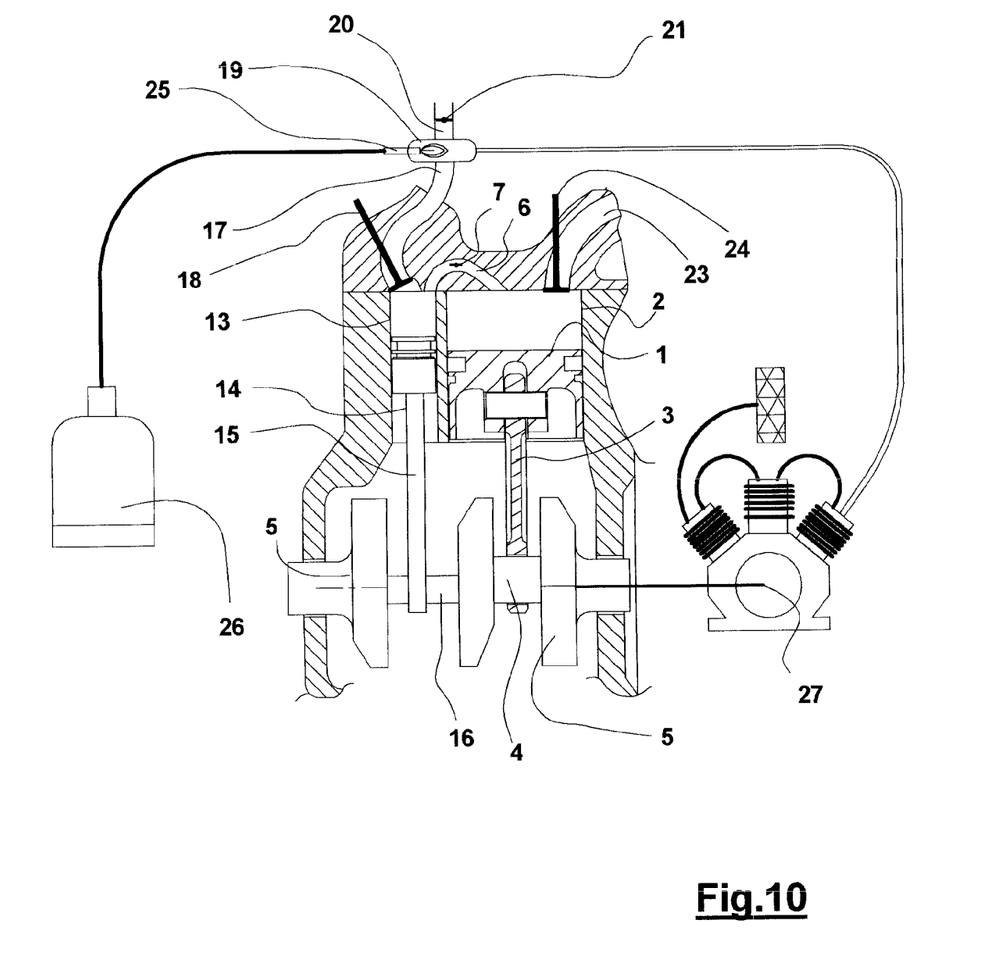
FIG. 10 depicts an engine with an active expansion chamber in fossil fuel mono-energy mode.

FIG. 10 shows a mono-energy engine with an active expansion chamber operating on a fossil fuel (or alternatively, on a fuel of plant or some other origin), the engine being coupled to a compressor 27 which supplies compressed air to the working capacity 19 which here comprises a burner 25 supplied with energy by a gas cylinder 26. The overall way in which the machine works is as described hereinabove.

The engine with an active expansion chamber is described for operation using compressed air. However, it can use any compressed gas without that in any way altering the invention as described.

The invention claimed is:

1. An engine supplied with compressed air, or with any other compressed gas contained in a high-pressure storage tank (22) and comprising:
   at least one main drive piston (1) which slides in a drive cylinder (2) driving a crankshaft (5) in a conventional connecting rod/crank arrangement,
   and at least one active expansion chamber which consists of a variable volume equipped with means allowing work to be produced and which is connected, by a passage (6), with the volume, called dead volume, contained in the driving cylinder (2) above the driving piston (1) at its top dead centre, characterized:
     in that the said passage (6) comprises a shutter (7) thus allowing the said active expansion chamber to be isolated from or to be placed in contact with the dead volume,
     in that the engine comprises an inlet duct (17) which opens in the active expansion chamber (13) and which allows the engine to be supplied with compressed air or with compressed gas,
   in that the compressed air or gas is let into the expansion chamber when this chamber is at its smallest volume and which, under the thrust of the compressed air, will increase in volume, thereby producing a work,
   in that when the expansion chamber is more or less at its maximum volume and the driving piston is more or less at its top dead centre, the inlet duct (17) is shuttered, and the said active expansion chamber (13) is placed in communication with the driving cylinder (2) and the compressed air, or the compressed gas, which is contained in the active expansion chamber expands, thus pushing the driving piston (1) back in its downstroke, thereby in its turn supplying a work,
   in that during the expansion, the volume of the active expansion chamber (13) is returned to its minimum volume to allow a new cycle to commence,
   in such a manner that the engine works according to a four-phase thermodynamic cycle:
     an isothermal expansion without work;
     a transfer-slight expansion with work said to be quasi-isothermal;
     a polytropic expansion with work;
     an exhaust at ambient pressure.

2. An engine with an active expansion chamber according to claim 1, characterized in that the said dead volume is reduced to the minimum that the mechanical tolerances can allow, so as to avoid work-free expansion when the active expansion chamber is placed in communication with the dead volume.

3. An engine according to claim 1, characterized in that it is supplied with compressed air or gas through a buffer capacity, said as the working capacity (19), which is supplied with the high-pressure compressed air contained in the storage tank (22) and which is expanded to a medium pressure, said as the working pressure, in the said working capacity (19), through a dynamic regulator device.

4. An engine with an active expansion chamber according to claim 3, characterized in that the working capacity (19) comprises a heating device (25) for heating the compressed air or gas using an additional energy, fossil fuel or some other form of energy, the said heating device allowing the temperature and/or the pressure of the air passing through it to be increased.

5. An engine with an active expansion chamber according to claim 4, characterized in that the compressed air or gas is heated by burning a fuel—fossil or biological—directly in the compressed air or gas, the engine then being said to be an external internal combustion engine.

6. An engine with an active expansion chamber according to claim 4, characterized in that the air contained in the working capacity is heated by burning a fuel—fossil or biological—through an exchanger, the flame having no contact with the compressed air or gas, the engine then being said to be an external external combustion engine.

7. An engine with an active expansion chamber according to claim 4, characterized in that the thermal heater is a thermal heater which uses a thermochemical solid method gas reaction based on the conversion by evaporation of a reactive fluid contained in an evaporator, for example liquid ammonia into a gas which will react with a solid reagent contained in a reactor, comprising salts including such as calcium chloride, manganese chloride, barium chloride, the chemical reaction of which produces heat and which, when the reaction is over, can be regenerated by supplying heat to the reactor in order to desorb the gaseous ammonia which will then recondense in the evaporator.

8. An engine with an active expansion chamber according to claim 4 characterized it operates in a dual-energy mode with an additional energy, and in that the thermodynamic cycle in this dual-energy mode is characterized by an isothermal expansion without work with the conservation of energy performed in the said working capacity, by increasing the temperature of the air or gas by heating it using fossil energy, followed by a very slight expansion known as quasi-isothermal, with work, polytropic expansion with work in the driving cylinder (2) and finally exhaust at atmospheric pressure, representing five successive phases as follows:
- an isothermal expansion;
- an increase in temperature;
- a transfer-slight expansion with work said to be quasi-isothermal;
- a polytropic expansion with work;
- an exhaust at ambient pressure.

9. An engine with an active expansion chamber according to claim 3, characterized in that the engine torque and engine speed are controlled by controlling the pressure in the said working capacity (19).

10. An engine with an active expansion chamber according to claim 8, characterized in that it operates in dual-energy operating mode with additional energy, and in that during the dual-energy mode, an electronic control unit controls the amount of additional energy supplied depending on the pressure of the compressed air or gas, and therefore on the mass of air introduced into the said working capacity (19).

11. An engine with an active expansion chamber according to claim 1, characterized in that the said variable volume of the active expansion chamber (13) consists of a piston (14), said as the charge piston, which slides in a cylinder (13) and which is connected by a connecting rod (15) to the crankshaft of the engine (9).

12. An engine with an active expansion chamber according to claim 3, characterized in that it is supplied with the compressed air or gas which is contained in the high-pressure tank (22) and/or in that it operates in dual-energy mode with additional energy, and in that, in order to allow autonomous operation when the compressed-air or gas storage tank is empty and when being used with additional energy, the engine with active expansion chamber is coupled to an air or gas compressor (27) allowing the high-pressure compressed-air or gas storage tank (22) to be supplied with compressed air or gas.

13. An engine with an active expansion chamber according to claim 12, characterized in that the said compressor (27) directly supplies the working capacity (19); in such a case, engine control is performed by controlling the pressure of the compressor, and a dynamic regulator (21) arranged between the high-pressure storage tank (22) and the working capacity remains shut off.

14. An engine with an active expansion chamber according to claim 13, characterized in that the coupled compressor (27) supplies in combination the storage tank (22) and the working capacity (19).

15. An engine with an active expansion chamber according to claim 13, characterized it operates in mono-energy mode with fossil fuel, plant fuel, allowing the air or gas contained in the working capacity (19), compressed only by the coupled compressor (27), to be heated, the high-pressure compressed-air or gas storage tank then being quite simply omitted.

16. An engine with an active expansion chamber according to claim 12, characterized in that the exhaust following relief is recirculated to the inlet side of the coupled compressor.

17. An engine with an active expansion chamber according to claim 1, operating in compressed air mono-energy mode, characterized in that the engine consists of several expansion stages of increasing cylinder capacity, each stage comprising an active expansion chamber consisting of a variable volume equipped with means allowing work to be produced and in that between each stage there is an exchanger (29) to heat the air exhausted from the previous stage.

18. An engine with an active expansion chamber according to claim 17, characterized in that it operates in dual-energy mode with additional energy, and in that the exchanger positioned between each stage is equipped with an additional-energy heating device.

19. An engine with an active expansion chamber according to claim 18, characterized in that the exchangers and the heating device are combined, together or separately, into a multi-stage device using the same source of energy.

20. An engine with an active expansion chamber according to claim 1, characterized in that it is supplied with the compressed air or gas which is contained in the high-pressure tank (22) and/or in that it operates in dual-energy mode with additional energy, and in that, in order to allow autonomous operation when the compressed-air or gas storage tank is empty and when being used with additional energy, the engine with active expansion chamber is coupled to an air or gas compressor (27) allowing the high-pressure compressed-air or gas storage tank (22) to be supplied with compressed air or gas.

* * * * *